United States Patent

[11] 3,598,208

| [72] | Inventor | Joachim C. Bronder<br>Stratford, Conn. |
|---|---|---|
| [21] | Appl. No. | 836,411 |
| [22] | Filed | June 25, 1969 |
| [45] | Patented | Aug. 10, 1971 |
| [73] | Assignee | Avco Corporation<br>Stratford, Conn. |

[54] LIQUID BRAKE DYNAMOMETER
2 Claims, 1 Drawing Fig.

[52] U.S. Cl. .................................................. 188/290
[51] Int. Cl. ............................................... F16d 57/02
[50] Field of Search .......................................... 188/90 A, 290

[56] References Cited
UNITED STATES PATENTS
1,718,175  6/1929  Nilson..................... 188/90 (A5)

2,634,830  4/1953  Cline.......................... 188/90 (A)
3,091,309  5/1963  Sheldon..................... 188/90 (A5)
FOREIGN PATENTS
11,267  5/1912  Great Britain................ 188/90 (A)

*Primary Examiner*—George F. A. Halvosa
*Attorneys*—Charles M. Hogan and Gary M. Gron ABSTRACT: The disclosure illustrates a liquid brake dynamometer having a rotor comprising a series of spaced perforated disks journaled in a chamber. Water is passed through the chamber at a given rate set by flow control valves so that the resistance to rotation of the rotor is primarily a function of the water flow. Air at a predetermined pressure level is injected into the housing to eliminate cavitation. The pressure of the injected air is adjustable to provide a vernier effect on the dynamometer's power absorption.

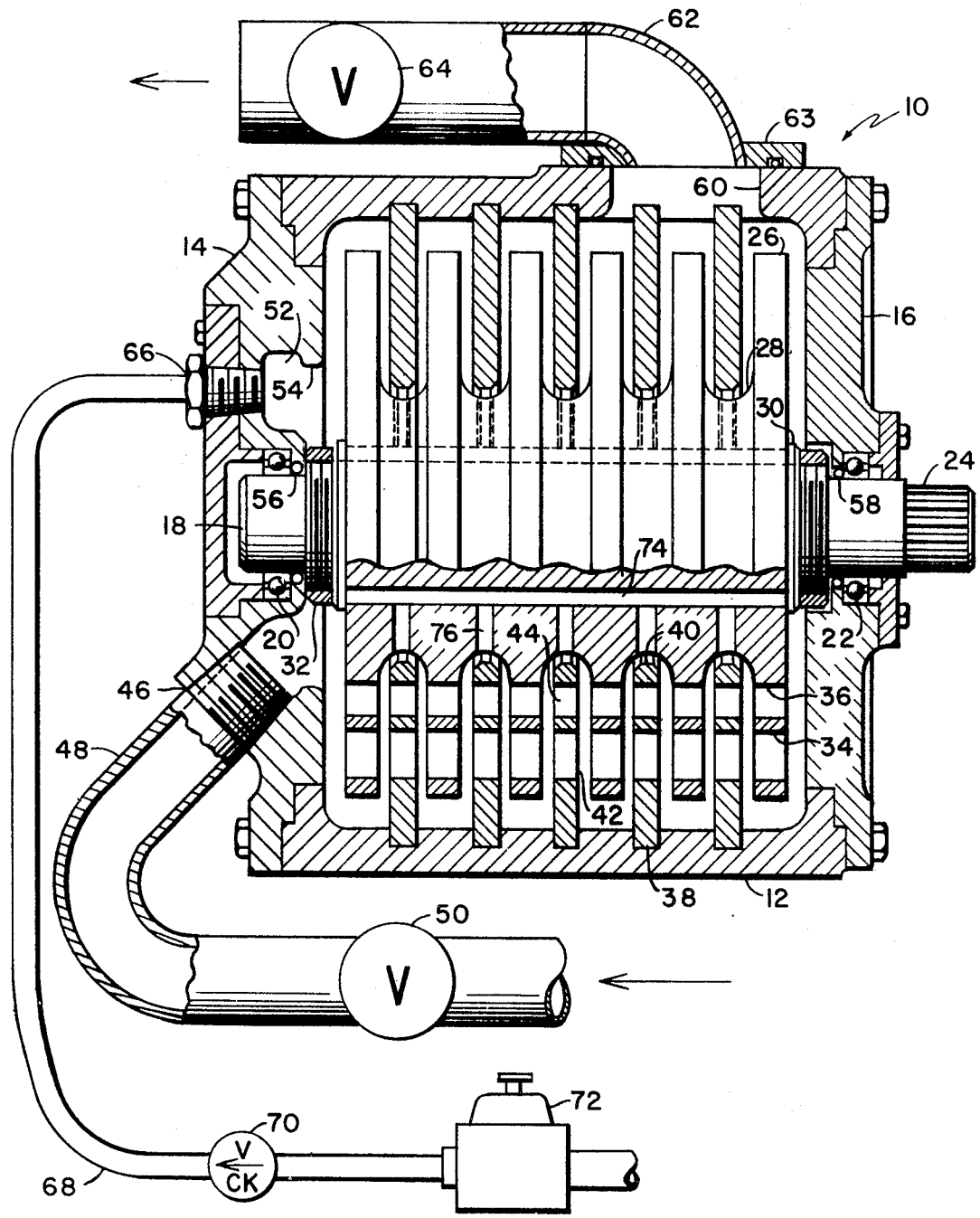
INVENTOR.
JOACHIM C. BRONDER

3,598,208

LIQUID BRAKE DYNAMOMETER

BACKGROUND OF THE INVENTION

Dynamometers of the water brake type have been extensively used in the testing of high-performance automotive and gas turbine engines. The reason for this is that the water brake dynamometers are capable of absorbing the high-power outputs of this type of engine for extended periods of time.

A typical water brake dynamometer will comprise a rotor element that rotates in a housing. Water or other fluid is passed through the housing so that the rate of water flow and the quantity of water in the chamber vary the resistance to rotation of the rotor. The rotor is connected to the engine whose power is to be measured and the resultant water flow through the housing is adjusted to absorb a given level of torque for a particular engine speed. While this type of dynamometer gives generally acceptable results, it sometimes has erratic performance. It has been found that this erratic performance is being caused by cavitation of the water in the dynamometer. Briefly stated, cavitation is a condition where the pressure in a turbulent fluid flow system at one point is low enough to permit boiling of the water. At another point, having a higher pressure, the vapor bubbles implode thereby generating a substantial pressure on the adjacent part and a high degree of noise.

SUMMARY OF THE INVENTION

The invention is used in a liquid brake dynamometer including a housing which has an element rotatable therein at varying rates. A device is provided for maintaining a flow of liquid through the housing to provide a resistance to the rotation of the element. The invention comprises a means for injecting gas into the housing at a pressure level sufficient to prevent cavitation of the liquid at the maximum-anticipated rate of rotation for said element.

In another more specific aspect of the invention the flow-maintaining device of the dynamometer described above is adapted to vary the flow through the housing to vary the resistance to rotation of the element at a first rate. The gas-injecting means is adapted to vary the pressure level of the gas introduced into the chamber to vary the resistance to rotation of the element at a second, substantially lower rate.

The above and other related features of the invention will be apparent from a reading of the description shown in the accompanying drawings and the novelty thereof pointed out in the appended claims.

The single drawing shows an exemplary water brake dynamometer with which the present invention is used.

Referring now to the drawing, there is shown a water brake dynamometer designated by the reference numeral 10. While a specific type of water brake dynamometer is illustrated, it should be apparent to those skilled in the art that other types of dynamometers could be used. For example, a centrifugal water pump discharging through a variable, highly restricted orifice may be employed with equivalent results.

The dynamometer 10 comprises a generally cylindrical casing 12 having circular end plates 14 and 16. A longitudinal shaft 18 is journaled for rotation in the end plates 14, 16 by bearings 20, 22, respectively. A splined end portion 24 of shaft 18 is connected to the output shaft of an engine to be tested. The shaft 18 provides a support for a rotor assembly which comprises a plurality of disks 26 separated by integral spacers 28 and stacked on the shaft 18. The disks 26 are restrained from rotation relative to shaft 18 by suitable means. As herein shown, the disks 26 are force fitted onto shaft 18. The shaft 18 has an integral end face 30 which abuts one end of the spaced disks 26 on the shaft 18. A sleeve 32 is threaded onto the opposite end to hold the disks 26 against end face 30.

The disks 26 each have a plurality of holes or perforations 34, 36. A series of stator plates 38, having an inner opening 40 surrounding the rotor, are mounted to the cylindrical element 12 in between adjacent disks 26. The stator plates 38 have openings 42, 44 which correspond to the openings 36, 34 in the rotor disks 26.

Housing 10 has an inlet port 46 into which a supply conduit 48 is connected. A variable area inlet valve 50 is interposed into conduit 48 to control a supply of liquid, such as water, to the housing 10 from a suitable source (not shown). The inlet port 46 connects with an annular inlet chamber 52 which connects with the interior of cylindrical casing 12 through an opening 54 near the center of rotation for disks 26. A suitable seal assembly 56 is provided on shaft 18 to prevent leakage of water from chamber 52. A similar seal 58 is provided at the opposite end of shaft 18 to prevent leakage of water from the interior of cylindrical casing 12. An outlet port 60 is provided at the opposite end of dynamometer 10 and in the periphery of cylindrical casing 12. An outlet conduit 62 is mounted over port 60 by a flange 63 and extends to a variable area valve 64 which controls the flow of water from dynamometer 10.

In accordance with the present invention, a means to inject pressurized air or other gas into the casing 12 is provided. This means comprises a fitting 66 secured to end plate 14 and a conduit 68 extending from fitting 66 to a suitable source of pressurized air or other gas. A check valve 70 and a pressure-regulating device 72 are interposed in the conduit 68. In addition, longitudinal passageways 74 are provided through the series of spaced disks 26. As herein shown, these passageways are formed by key slots which have their key removed. It is to be understood that other ways of accomplishing this end could be used with equal success. A series of radial passageways 76 are formed between adjacent disks 26 and extend from the passageways 74 to the inner side of the stator plates 38.

In operation, the splined shaft 24 is connected to the engine to be tested and rotated. As water flows through inlet opening 54, it is thrown in a radially outward direction by the first rotor disk 26. This causes the dynamometer to act as an inefficient pump and to force the flow of water through the openings in adjacent disks 26 and stator plates 38 to the outlet 60. The resultant flow of water or other liquid through the housing 10 and therefore the quantity of water in housing 10 is selected by adjusting the valves 50 and 64. The rotor rotation is resisted by friction between the rotor disks and the water and by the momentum change of the water. The level of resistance and the resultant torque absorbed is then controlled by adjusting the flow through the housing. In a water brake of this type the high rotational speeds of the rotor disks shear the water with such great speed that the local pressure in the openings may be low enough to cause cavitation.

To eliminate this phenomena the pressure regulator 72 is adjusted to deliver a source of pressurized air to the casing 12 of the dynamometer 10. The introduction of the gas pressurizes the housing to a level above that where boiling of the water would be encountered. Furthermore, it has been found that the pressure level in a rotor required to prevent boiling increases with increasing rotor speeds. Therefore, the pressure of the gas injected into the dynamometer is maintained at a level which will eliminate cavitation for the maximum-attainable speed of the rotor. It has been found, also, that the pressurized gas is advantageously introduced into the system at a radially inward portion owing to the normally high pressure increase between the radially inward portion of the first disk rotor to its circumference.

To enable even distribution of the increased pressure level the longitudinal passageways 74 and the radial passageways 76 provide a communication from the inlet chamber 52 to the spaces in between adjacent rotors. This insures an even distribution of the pressurized gas and a pressure on dynamometer 10 which would suppress cavitation in all stages of a multistage dynamometer.

It has also been found that the pressure level of the gas injected into the dynamometer may be further increased to provide a vernier absorption factor for the dynamometer. In normal operation the water flow through the dynamometer can only be controlled to provide gross changes of torque absorption. However, the pressure level of the air is conveniently increased by adjusting regulator 72 to force the water through the holes at a higher rate and therefore decrease the power absorption of the dynamometer. The amount of power absorption change for a given air pressure change is substantially lower than that for a given change of water flow thereby enabling a highly accurate selection of the power absorption level.

Having thus described the invention what I claim as novel and desired to be secured by Letters Patent of the United States is:

1. In combination:

an elongated generally cylindrical housing;

an elongated rotatable element positioned in said housing and comprising a series of perforated axially spaced disks mounted on a shaft for rotation in said housing;

a plurality of perforated stator disks supported by said housings in between adjacent rotatable disks;

means for maintaining a flow of liquid through said housing thereby to resist the rotation of said disks, said flow-maintaining means including a flow path having an inlet to said elongated housing at one end of the disks near their center of rotation and an outlet at the other end of the stacked disks away from their center of rotation whereby the liquid passes generally axially and radially outward through the stator and rotating disks;

means for injecting gas into the inlet end of said housing; and passageway means carried by said elongated rotatable element providing a flow path for gas from said inlet end of said housing to a plurality of locations along said rotatable element.

2. Apparatus as in claim 1 wherein said gas is injected adjacent the center of rotation of said disks and said passageway means comprises:

means for forming a longitudinal passageway extending through each of the rotatable disks near their center of rotation; and means for forming a plurality of radial passageways extending from said longitudinal passageway to connect said longitudinal passageway with the stator disks between adjacent rotatable disks whereby pressurized gas is uniformly distributed between adjacent rotatable disks.